US008433853B2

(12) United States Patent
Eddy et al.

(10) Patent No.: US 8,433,853 B2
(45) Date of Patent: *Apr. 30, 2013

(54) PREFETCHING OF NEXT PHYSICALLY SEQUENTIAL CACHE LINE AFTER CACHE LINE THAT INCLUDES LOADED PAGE TABLE ENTRY

(75) Inventors: Colin Eddy, Austin, TX (US); Rodney E. Hooker, Austin, TX (US)

(73) Assignee: VIA Technologies, Inc, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,934

(22) Filed: Mar. 6, 2012

(65) Prior Publication Data

US 2012/0198176 A1  Aug. 2, 2012

Related U.S. Application Data

(63) Continuation of application No. 12/604,998, filed on Oct. 23, 2009, now Pat. No. 8,161,246.

(60) Provisional application No. 61/164,588, filed on Mar. 30, 2009.

(51) Int. Cl.
*G06F 12/00* (2006.01)

(52) U.S. Cl.
USPC ........... 711/137; 711/204; 711/205; 711/206; 711/207; 711/E12.057; 711/E12.061

(58) Field of Classification Search .................. 711/137, 711/204, 205, 206, 207, E12.057, E12.061
See application file for complete search history.

(56) References Cited

U.S. PATENT DOCUMENTS

| 5,613,083 | A | * | 3/1997 | Glew et al. ................ 711/207 |
| 5,666,509 | A | | 9/1997 | McCarthy et al. |
| 5,752,274 | A | | 5/1998 | Garibay et al. |
| 5,963,984 | A | | 10/1999 | Garibay et al. |
| 6,681,311 | B2 | * | 1/2004 | Gaskins et al. ............. 711/203 |
| 7,409,524 | B2 | * | 8/2008 | Safford et al. ............. 711/205 |
| 7,480,769 | B2 | * | 1/2009 | Diefendorff et al. ........ 711/137 |
| 2006/0047915 | A1 | * | 3/2006 | Janik et al. ................. 711/137 |

(Continued)

FOREIGN PATENT DOCUMENTS

WO  WO 2006065416 A2 * 6/2006

OTHER PUBLICATIONS

Bala, Kavita et al., "Software Prefetching and Caching for Translation Lookaside Buffers." Downloaded on Mar. 11, 2009 from https://eprints.kfupm.edu.sa/65603/1/65603.pdf pp. 1-11.

(Continued)

*Primary Examiner* — Reginald Bragdon
*Assistant Examiner* — Mehdi Namazi
(74) *Attorney, Agent, or Firm* — E. Alan Davis; James W. Huffman

(57) ABSTRACT

A microprocessor includes a translation lookaside buffer, a request to load a page table entry into the microprocessor generated in response to a miss of a virtual address in the translation lookaside buffer, and a prefetch unit. The prefetch unit receives a physical address of a first cache line that includes the requested page table entry and responsively generates a request to prefetch into the microprocessor a second cache line that is the next physically sequential cache line to the first cache line.

20 Claims, 2 Drawing Sheets

U.S. PATENT DOCUMENTS

| | | | |
|---|---|---|---|
| 2006/0136696 A1 | 6/2006 | Grayson | |
| 2006/0265552 A1* | 11/2006 | Davis et al. | 711/137 |
| 2007/0283123 A1* | 12/2007 | Vick et al. | 711/207 |
| 2008/0155226 A1* | 6/2008 | Davis et al. | 711/207 |
| 2009/0006762 A1* | 1/2009 | Gara et al. | 711/137 |
| 2009/0013149 A1* | 1/2009 | Uhlig et al. | 711/207 |
| 2009/0019254 A1* | 1/2009 | Stecher | 711/207 |
| 2009/0198907 A1* | 8/2009 | Speight et al. | 711/137 |
| 2010/0011188 A1* | 1/2010 | Eddy et al. | 711/207 |
| 2010/0036987 A1 | 2/2010 | Streett et al. | |
| 2011/0145509 A1* | 6/2011 | Speight et al. | 711/137 |

OTHER PUBLICATIONS

Sarda, Parag et al, "Evaluation of TLB Prefetching Techniques." Downloaded on Mar. 20, 2009 from http://people.csa.iisc.emet.in/parag/Projects_files/Report.pdf pp. 1-5.

* cited by examiner

PREFETCHING OF NEXT PHYSICALLY SEQUENTIAL CACHE LINE AFTER CACHE LINE THAT INCLUDES LOADED PAGE TABLE ENTRY

CROSS REFERENCE TO RELATED APPLICATION(S)

This application is a continuation of U.S. patent application Ser. No. 12/604,998, filed Oct. 23, 2009 now U.S. Pat. No. 8,161,246, which is hereby incorporated by reference in its entirety and which claims priority based on U.S. Provisional Application Ser. No. 61/164,588, filed Mar. 30, 2009, which is hereby incorporated by reference in its entirety.

FIELD OF THE INVENTION

The present invention relates in general to microprocessors, and more particularly to the prefetching of data thereby.

BACKGROUND OF THE INVENTION

Many modern microprocessors include virtual memory capability, and in particular, a memory paging mechanism. As is well known in the art, the operating system creates page tables that it stores in system memory that are used to translate virtual addresses into physical addresses. The page tables may be arranged in a hierarchical fashion, such as according to the well-known scheme employed by x86 architecture processors as described in Chapter 3 of the IA-32 Intel Architecture Software Developer's Manual, Volume 3A: System Programming Guide, Part 1, June 2006, which is hereby incorporated by reference in its entirety for all purposes. In particular, page tables include page table entries (PTE), each of which stores a physical page address of a physical memory page and attributes of the physical memory page. The process of taking a virtual memory page address and using it to traverse the page table hierarchy to finally obtain the PTE associated with the virtual address in order to translate the virtual address to a physical address is commonly referred to as a tablewalk.

Because the latency of a physical memory access is relatively slow, the tablewalk is a relatively costly operation since it involves potentially multiple accesses to physical memory. To avoid incurring the time associated with a tablewalk, processors commonly include a translation lookaside buffer (TLB) that caches the virtual to physical address translations. However, the size of the TLB is finite, and when a TLB miss occurs, the tablewalk must be incurred. Therefore, what is needed is a way to reduce the time required to perform a page table walk.

BRIEF SUMMARY OF INVENTION

In one aspect, the present invention provides a microprocessor. The microprocessor includes a translation lookaside buffer, a request to load a page table entry into the microprocessor generated in response to a miss of a virtual address in the translation lookaside buffer, and a prefetch unit. The prefetch unit receives a physical address of a first cache line that includes the requested page table entry and responsively generates a request to prefetch into the microprocessor a second cache line that is the next physically sequential cache line to the first cache line.

In another aspect, the present invention provides a method for reducing tablewalk time by a microprocessor having a translation lookaside buffer. The method includes requesting to load a page table entry into the microprocessor in response to a miss of a virtual address in the translation lookaside buffer. The method also includes receiving a physical address of a first cache line that includes the requested page table entry. The method also includes generating a request to prefetch into the microprocessor a second cache line that is the next physically sequential cache line to the first cache line in response to receiving the physical address of the first cache line that includes the requested page table entry.

In yet another aspect, the present invention provides a microprocessor. The microprocessor includes a translation lookaside buffer, a request to load a page table entry into the microprocessor generated in response to a miss of a virtual address in the translation lookaside buffer, and a prefetch unit. The prefetch unit receives a physical address of a first cache line that includes the requested page table entry and responsively generates a request to prefetch into the microprocessor a second cache line that is the previous physically sequential cache line to the first cache line.

In yet another aspect, the present invention provides a method for reducing tablewalk time by a microprocessor having a translation lookaside buffer. The method includes requesting to load a page table entry into the microprocessor in response to a miss of a virtual address in the translation lookaside buffer. The method also includes receiving a physical address of a first cache line that includes the requested page table entry. The method also includes generating a request to prefetch into the microprocessor a second cache line that is the previous physically sequential cache line to the first cache line in response to receiving the physical address of the first cache line that includes the requested page table entry.

DETAILED DESCRIPTION OF THE INVENTION

Figure 1:
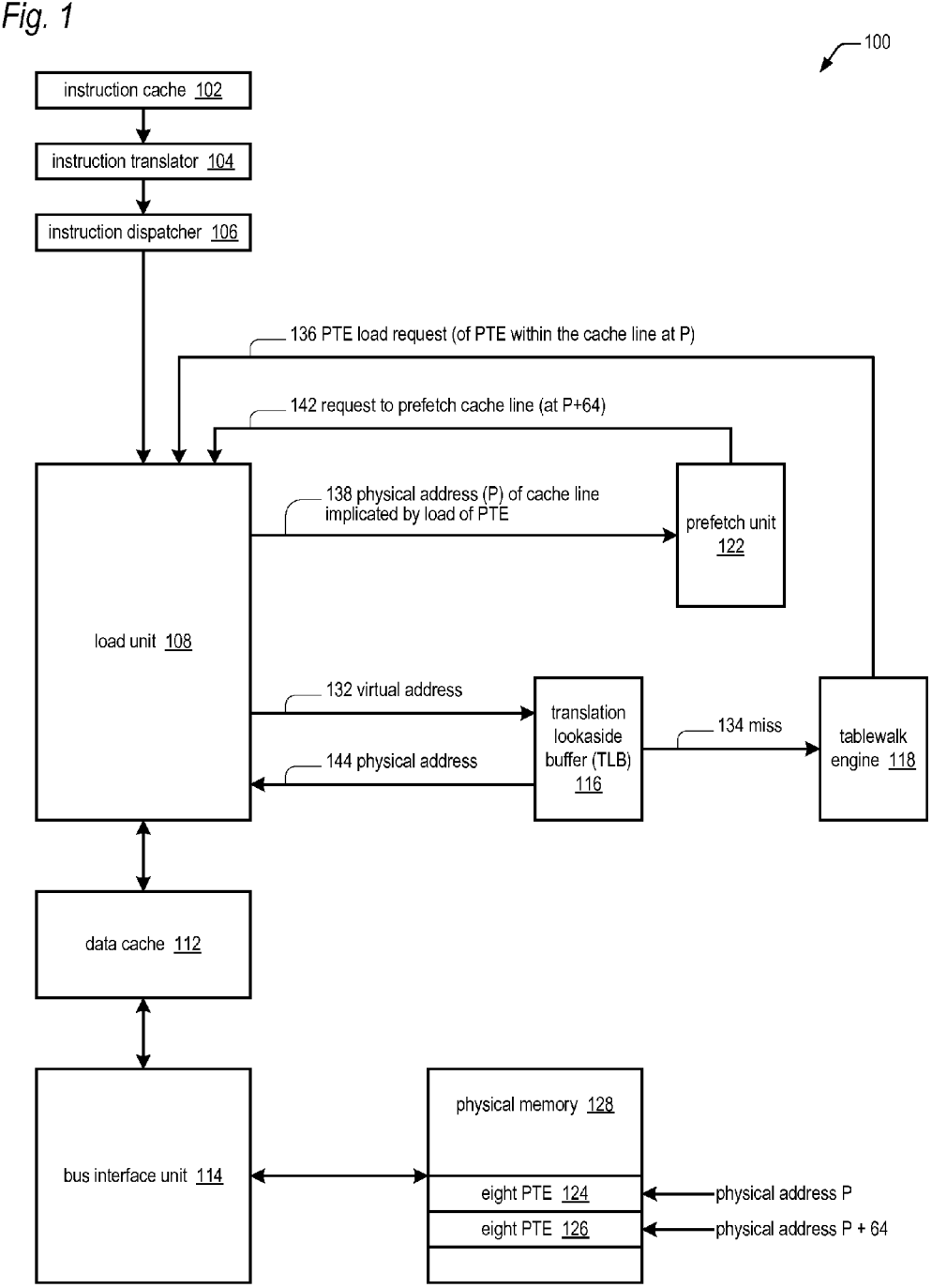
FIG. 1 is a block diagram illustrating a microprocessor according to the present invention.

Referring now to FIG. 1, a block diagram illustrating a microprocessor 100 according to the present invention is shown. The microprocessor 100 includes The microprocessor 100 is a pipelined microprocessor that includes an instruction cache 102 that provides instructions to an instruction translator 104, which translates instructions and provides them to an instruction dispatcher 106. The instructions may include memory access instructions (such as load or store instructions) that are provided to a load unit 108. The load unit 108 provides the virtual address 132 specified by a memory access instruction to a translation lookaside buffer (TLB) 116 that does a lookup of the virtual address 132 and provides the translated physical address 144, if present, back to the load unit 108. If the virtual address 132 is not present, the TLB 116 generates a miss signal 134 to a tablewalk engine 118, which is coupled to the load unit 108 and to the TLB 116.

A prefetch unit 122 and data cache 112 are also coupled to the load unit 108. Finally, a bus interface unit 114 is coupled to the data cache 112. The bus interface unit 114 interfaces the microprocessor 100 to a processor bus that is coupled to physical memory 128 of the computer system in which the microprocessor 100 resides. The physical memory 128, among other things, stores page tables, one of which includes a first cache line of eight PTE 124 at physical address P and a second cache line of eight PTE 126 at physical address P+64

(the size of a cache line being 64 bytes in the embodiment of FIG. 1). In the embodiments described, it is assumed that the size of a PTE is eight bytes; thus, each cache line may hold eight PTE.

Figure 2:
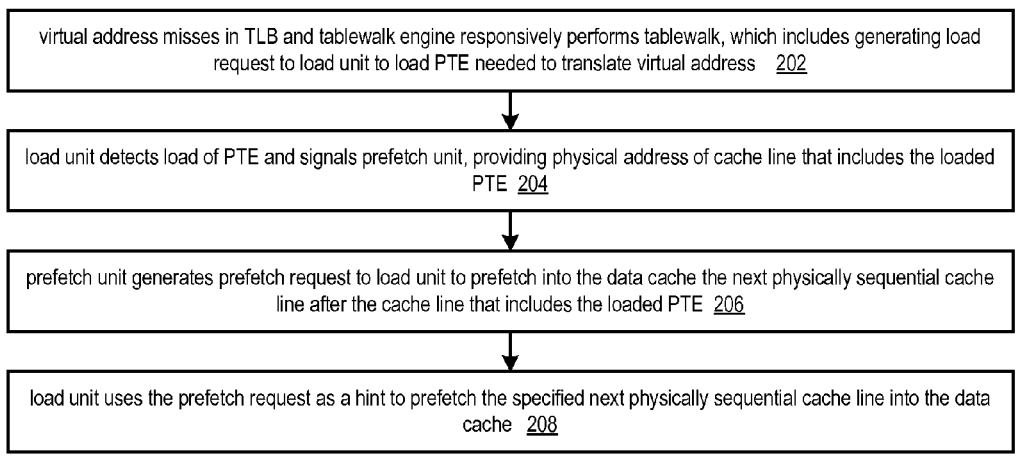
FIG. 2 is a flowchart illustrating steps performed by the microprocessor of FIG. 1 according to the present invention.

Referring now to FIG. 2, a flowchart illustrating operation of the microprocessor 100 of FIG. 1 to prefetch a next sequential cache line to a cache line implicated by a PTE load according to the present invention is shown. Flow begins at block 202.

At block 202, when the virtual address 132 misses in the TLB 116, the TLB 116 generates a miss signal 134 to a tablewalk engine 118. The tablewalk engine 118 responsively performs a tablewalk in order to obtain the physical address translation of the virtual address 132 missing in the TLB 116. The tablewalk includes the tablewalk engine 118 generating a PTE load request 136 to the load unit 108 to load a PTE needed to perform the address translation. Flow proceeds to block 204.

At block 204, the load unit 108 responsively detects the PTE load request 136 and loads the PTE from its location in the physical memory 128. Additionally, the load unit 108 signals the prefetch unit 122 via signal 138 that it has seen a PTE load request and provides to the prefetch unit 122 the physical address 138 of the cache line 124 that includes the loaded PTE, which is at physical address P in the example of FIG. 1. Flow proceeds to block 206.

At block 206, the prefetch unit 122 responsively generates to the load unit 108 a prefetch request 142. The prefetch request 142 requests the load unit 108 to prefetch into the data cache 112 the cache line 126 at physical address P+64, i.e., the next physically sequential cache line 126 after the cache line that includes the PTE loaded at block 204. Flow proceeds to block 208.

At block 208, the load unit 108 uses the prefetch request 142 as a hint to prefetch into the data cache 112 the next physically sequential cache line 126. In particular, the load unit 108 attempts to load the cache line 126 into the data cache 112. However, under some circumstances present within the microprocessor 100, the load unit 108 may decide to forego the loading of the cache line 126. One circumstance may be a functional requirement, such as that the cache line falls in an architecturally non-cacheable memory region. Another circumstance may be a heuristic decision, such as the utilization of resources for performing cache line allocations has risen above some watermark suggesting that the microprocessor 100 should minimize speculative allocations in favor of pursuing non-speculative allocations. If the load unit 108 decides to load the next sequential cache line 126 from physical memory 128, the load unit 108 commands the bus interface unit 114 to do so. Flow ends at block 208.

Although the embodiments described have prefetched the next sequential physical cache line, in alternate embodiments, the prefetch unit generates a request to prefetch the previous sequential physical cache line, either instead of or in addition to the next sequential physical cache line. These embodiments are advantageous if the program is proceeding through memory pages in the other direction.

Additionally, although the embodiments described have prefetched the next sequential physical cache line of PTE, embodiments are contemplated in which the prefetch unit generates a request to prefetch the next sequential physical cache line of other levels of a paging information hierarchy, such as a cache line of page descriptor entries (PDE), although one would expect a smaller benefit. The sheer volume of the physical memory underlying a single PDE suggests that the reward would be low due to infrequency and the risk would be high due to the relatively lethargic rate at which a program tends to traverse memory, although the access patterns of some programs might see a benefit. Still further, embodiments are contemplated in which the prefetch unit generates a request to prefetch the next sequential physical cache line of information within a different page table hierarchy structure than the well-known PDE/PTE hierarchy discussed herein.

As described above, the prefetch unit generates a request to prefetch the next physically sequential cache line to the cache line just read that includes the PTE needed to complete the tablewalk. Assuming each page table is 4 KB, each PTE is eight bytes, and each cache line is 64 bytes, then there are 64 cache lines each having eight PTE in a page table; thus, it is highly probable that the next physically sequential cache line prefetched at block 208 contains the next eight PTE in the page table. The probability is particularly high if the operating system lays out the page tables physically sequential to one another.

This is advantageous because there is a relatively high probability, particularly with small pages (typically 4 KB), that the program will eventually access at least some of the next eight pages of memory beyond the current page that was virtually accessed to cause the TLB miss at block 202. For a relatively modest amount of additional logic added to the prefetch unit and load unit, in one embodiment the prefetch unit generates a request to prefetch eight PTE, which may potentially greatly reduce the number of clock cycles required to perform a page table walk to populate the TLB for the eight memory pages whose physical address is stored in the eight PTE. Specifically, when the tablewalk engine 118 has to do a tablewalk that involves a load of any of the eight PTE in the next physically sequential cache line 126, they will be present in the data cache 112 (unless they are subsequently evicted from the data cache 112), which will eliminate the need for the long latency read of physical memory 128 to get the PTE.

Prefetch schemes exist which attempt to detect memory access patterns of program memory accesses, i.e., program instruction loads and stores. If the prefetcher detects the program accessing memory in a pattern, the prefetcher will attempt to anticipate the addresses of future program loads/stores and prefetch from them. If the program is accessing memory sequentially, the prefetcher may prefetch the next sequential cache line, typically based on the virtual address of the load/store. In a processor architecture for which the operating system performs tablewalks, the program load/store-based prefetcher may prefetch the next sequential cache line after a PTE load. However, in processors that perform the tablewalks in hardware, rather than using program load/stores, the program load/store-based prefetcher will not trigger off a PTE load, since it is not a program load, and will therefore not prefetch the next sequential cache line after a PTE load. Advantageously, in our hardware-based tablewalk microprocessor, our prefetch unit triggers off of a non-program PTE load, which is a physical memory access generated by our tablewalk engine. Thus, unlike the program load/store-based schemes, the prefetch unit generates requests to advantageously prefetch the next physically sequential cache line, which likely contains the next few PTE in the page table.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
a translation lookaside buffer;
a request to load a page table entry into the microprocessor generated in response to a miss of a first virtual address in the translation lookaside buffer;
a prefetch unit, configured to receive a physical address of a first cache line that includes the requested page table entry, wherein the prefetch unit is further configured to responsively generate a request to prefetch into the microprocessor a second cache line that is the next physically sequential cache line to the first cache line; and
a tablewalk engine configured to perform a tablewalk in response to an indication that a second virtual address is missing in the translation lookaside buffer, wherein the second virtual address implicates a page table entry contained in the prefetched second cache line, wherein to perform the tablewalk, the tablewalk engine loads into the translation lookaside buffer from within the microprocessor, rather than from system memory, a physical page address stored in the page table entry implicated by the missing second virtual address.

2. The microprocessor of claim 1, wherein the second cache line is absent the page table entry implicated by the first virtual address that missed in the translation lookaside buffer.

3. The microprocessor of claim 1,
wherein the tablewalk engine is configured to perform a second tablewalk in response to the miss of the first virtual address in the translation lookaside buffer, wherein the second tablewalk does not access any of the page table entries in the prefetched second cache line.

4. The microprocessor of claim 1, wherein the request to load the page table entry, in response to which the prefetch unit prefetches the second cache line, is generated internally by the microprocessor in response to the miss of the first virtual address in the translation lookaside buffer, rather than the load request being a load request of a program executed by the microprocessor.

5. The microprocessor of claim 1, further comprising:
a request to load a page directory entry into the microprocessor generated in response to the miss of the first virtual address in the translation lookaside buffer; wherein the prefetch unit is further configured to receive a physical address of a third cache line that includes the requested page directory entry, wherein the prefetch unit is further configured to responsively generate a second request to prefetch into the microprocessor a fourth cache line that is the next physically sequential cache line to the third cache line.

6. A method for reducing tablewalk time by a microprocessor having a translation lookaside buffer, the method comprising:
requesting to load a page table entry into the microprocessor, in response to a miss of a first virtual address in the translation lookaside buffer;
receiving a physical address of a first cache line that includes the requested page table entry; generating a request to prefetch into the microprocessor a second cache line that is the next physically sequential cache line to the first cache line, in response to said receiving the physical address of the first cache line that includes the requested page table entry; and
performing a tablewalk in response to an indication that a second virtual address is missing in the translation lookaside buffer, wherein the second virtual address implicates a page table entry contained in the prefetched second cache line;
wherein said performing the tablewalk comprises loading into the translation lookaside buffer from within the microprocessor, rather than from system memory, a physical page address stored in the page table entry implicated by the missing second virtual address.

7. The method of claim 6, wherein the second cache line is absent the page table entry implicated by the first virtual address that missed in the translation lookaside buffer.

8. The method of claim 6, further comprising:
performing a second tablewalk in response to the miss of the first virtual address in the translation lookaside buffer, wherein the second tablewalk does not access any of the page table entries in the prefetched second cache line.

9. The method of claim 6, wherein said requesting to load the page table entry, in response to which said generating the request to prefetch into the microprocessor the second cache line, is generated internally by the microprocessor in response to the miss of the first virtual address in the translation lookaside buffer, rather than the load request being a load request of a program executed by the microprocessor.

10. The method of claim 6, further comprising:
requesting to load a page directory entry into the microprocessor, in response to the miss of the first virtual address in the translation lookaside buffer;
receiving a physical address of a third cache line that includes the requested page directory entry; and
generating a second request to prefetch into the microprocessor a fourth cache line that is the next physically sequential cache line to the third cache line, in response to said receiving the physical address of the third cache line that includes the requested page directory entry.

11. A microprocessor, comprising:
a translation lookaside buffer;
a request to load a page table entry into the microprocessor generated in response to a miss of a first virtual address in the translation lookaside buffer;
a prefetch unit, configured to receive a physical address of a first cache line that includes the requested page table entry, wherein the prefetch unit is further configured to responsively generate a request to prefetch into the microprocessor a second cache line that is the previous physically sequential cache line to the first cache line; and a tablewalk engine configured to perform a tablewalk in response to an indication that a second virtual address is missing in the translation lookaside buffer, wherein the second virtual address implicates a page table entry contained in the prefetched second cache line, wherein to perform the tablewalk, the tablewalk engine loads into the translation lookaside buffer from within the microprocessor, rather than from system memory, a physical page address stored in the page table entry implicated by the missing second virtual address.

12. The microprocessor of claim 11, wherein the second cache line is absent the page table entry implicated by the first virtual address that missed in the translation lookaside buffer.

13. The microprocessor of claim 11,
wherein the tablewalk engine is configured to perform a second tablewalk in response to the miss of the first virtual address in the translation lookaside buffer, wherein the second tablewalk does not access any of the page table entries in the prefetched second cache line.

14. The microprocessor of claim 11, wherein the request to load the page table entry, in response to which the prefetch unit prefetches the second cache line, is generated internally by the microprocessor in response to the miss of the first virtual address in the translation lookaside buffer, rather than the load request being a load request of a program executed by the microprocessor.

15. The microprocessor of claim 11, further comprising:
a request to load a page directory entry into the microprocessor generated in response to the miss of the first virtual address in the translation lookaside buffer;
wherein the prefetch unit is further configured to receive a physical address of a third cache line that includes the requested page directory entry, wherein the prefetch unit is further configured to responsively generate a second request to prefetch into the microprocessor a fourth cache line that is the previous physically sequential cache line to the third cache line.

16. A method for reducing tablewalk time by a microprocessor having a translation lookaside buffer, the method comprising:
requesting to load a page table entry into the microprocessor, in response to a miss of a first virtual address in the translation lookaside buffer;
receiving a physical address of a first cache line that includes the requested page table entry;
generating a request to prefetch into the microprocessor a second cache line that is the previous physically sequential cache line to the first cache line, in response to said receiving the physical address of the first cache line that includes the requested page table entry; and
performing a tablewalk in response to an indication that a second virtual address is missing in the translation lookaside buffer, wherein the second virtual address implicates a page table entry contained in the prefetched second cache line;
wherein said performing the tablewalk comprises loading into the translation lookaside buffer from within the microprocessor, rather than from system memory, a physical page address stored in the page table entry implicated by the missing second virtual address.

17. The method of claim 16, wherein the second cache line is absent the page table entry implicated by the first virtual address that missed in the translation lookaside buffer.

18. The method of claim 16, further comprising:
performing a second tablewalk in response to the miss of the first virtual address in the translation lookaside buffer, wherein the second tablewalk does not access any of the page table entries in the prefetched second cache line.

19. The method of claim 16, wherein said requesting to load the page table entry, in response to which said generating the request to prefetch into the microprocessor the second cache line, is generated internally by the microprocessor in response to the miss of the first virtual address in the translation lookaside buffer, rather than the load request being a load request of a program executed by the microprocessor.

20. The method of claim 16, further comprising:
requesting to load a page directory entry into the microprocessor, in response to the miss of the first virtual address in the translation lookaside buffer;
receiving a physical address of a third cache line that includes the requested page directory entry; and
generating a second request to prefetch into the microprocessor a fourth cache line that is the previous physically sequential cache line to the third cache line, in response to said receiving the physical address of the third cache line that includes the requested page directory entry.

* * * * *